Nov. 17, 1959 — W. M. BROOKS ET AL — 2,913,274
LOOP SEAL
Filed March 13, 1957
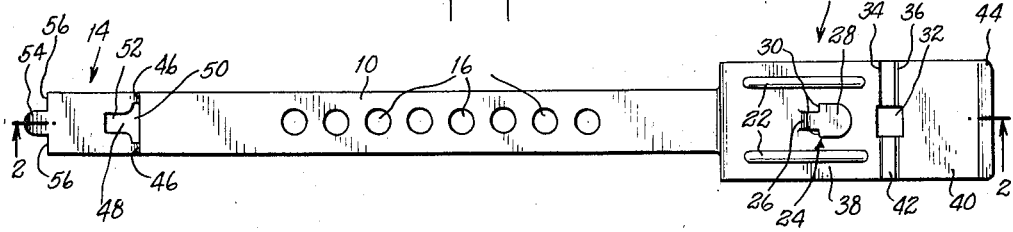
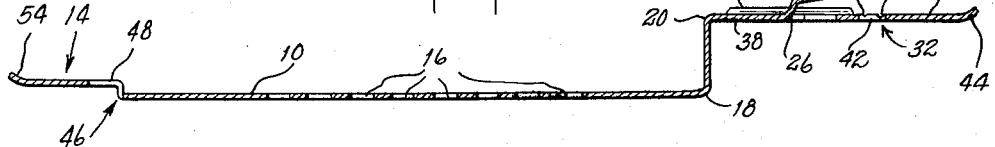
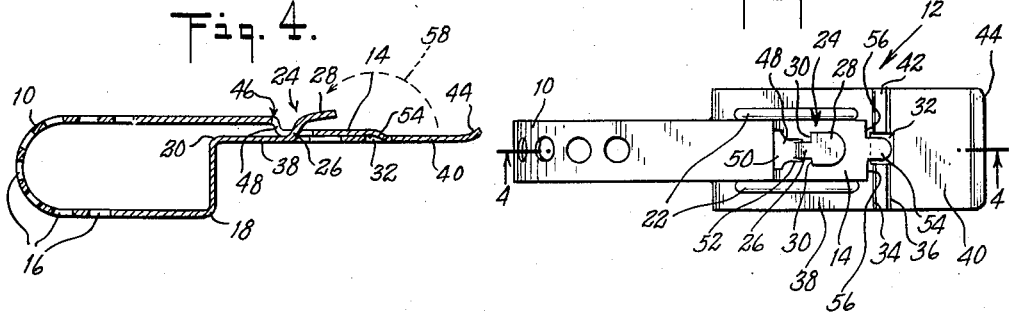
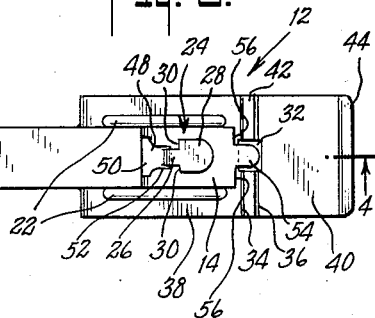
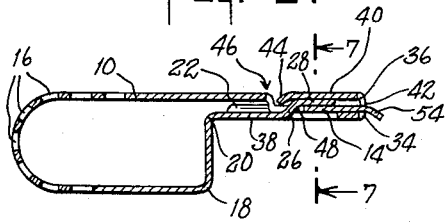
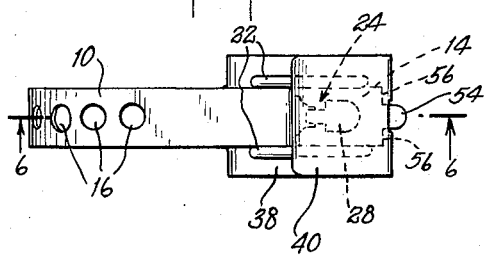
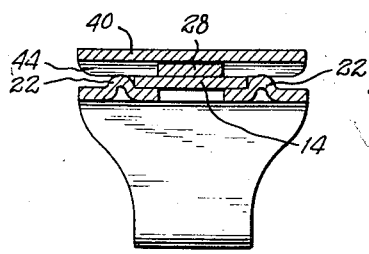
INVENTORS
WINFRED M. BROOKS
SIGURD M. MOBERG
BY Robert Henderson
ATTORNEY United States Patent Office 2,913,274
Patented Nov. 17, 1959

2,913,274
LOOP SEAL

Winfred M. Brooks, West Orange, and Sigurd M. Moberg, Pompton Plains, N.J., assignors to E. J. Brooks Company, Newark, N.J., a corporation of New Jersey Application March 13, 1957, Serial No. 645,840

7 Claims. (Cl. 292—317)

The present invention relates to seals of the character having a loop which may extend through openings in two things to be sealed together, or through a hasp, or indeed with respect to any structure wherein a closed and sealed loop may function as a safeguard against undetectable separation of two things to be sealed together or against the undetectable opening of a hasp or the like.

Having in mind that seals such as are disclosed in the present application may be made of various materials, some more sturdy than others, it will be appreciated that such seals may be used for a wide variety of articles. Thus, seals of this type may be used for sealing instruments against undetected opening or usage, in which event the materials used in the manufacture of the seal would be relatively light materials. On the other hand, seals such as are disclosed herein could be made of more sturdy materials to enable them to be utilized for sealing doors of railroad cars or of other vehicles.

An important object of this invention is the provision of an inexpensive seal which may be closed and opened without the use of any tool.

Another important object of this invention is the provision of a seal formed in one piece yet capable of satisfactorily replacing certain prior types of seals requiring the use of two or more pieces for sealing purposes.

Another important object of this invention is the provision of a seal which is not usable for a second time or, i.e., after having once been put into service for sealing purposes, it cannot be removed and reused without being either cut or broken, in either of which circumstances, of course, the fact of reuse or attempted reuse would be readily apparent.

The foregoing and other more or less obvious objects are accomplished by seals according to this invention of which a preferred embodiment is illustrated in the accompanying drawing without, however, limiting the invention to that particular embodiment.

In the drawing:

Figure 1 is a top plan view of a seal according to this invention in the form in which it is manufactured and before it is put into use.

Fig. 2 is a longitudinal sectional view of said seal substantially on the line 2—2 of Fig. 1.

Fig. 3 is a top view of said seal after performance of a first manual step in the closing or sealing of the seal.

Fig. 4 is a longitudinal sectional view of the seal in its condition as shown in Fig. 3, the section being substantially on the line 4—4 of the latter figure.

Fig. 5 is a top view of said seal in its completely closed or sealed condition.

Fig. 6 is a longitudinal sectional view of the seal in its fully closed condition, the section being substantially on the line 6—6 of Fig. 5.

Fig. 7 is a cross-sectional view of said seal substantially on the line 7—7 of Fig. 6.

A seal according to this invention and as illustrated in the drawing may be formed of relatively thin tinned or electro-plated steel but it could, of course, be made of other sheet metal as, for example, aluminum or zinc. In the illustrated embodiment, the seal is in the nature of a strip of such suitable sheet metal which may be considered as consisting of three main parts, (1) a shackle or loop portion 10 which is quite narrow and, as illustrated, is of substantially uniform width, (2) a wider or enlarged locking head 12 at one end of the shackle portion and (3) a locking tongue 14 at the other end of the shackle portion.

The shackle portion 10 is the part of the seal which, in use, passes through an eye of a hasp or through two eyes or apertures in members to be sealed together. In the form in which the device is manufactured, the shackle portion 10 is approximately straight as shown in Figs. 1 and 2 but, in use, after the locking tongue 14 and a part of the shackle portion 10 have been threaded through a hasp eye or through eyes of things to be sealed together, the shackle portion 10 is bent into the form of a loop, as may best be understood by reference to Figs. 4 and 6, to bring the locking tongue 14 into locking association with the locking head 12 as hereinafter explained in detail. The sheet metal of which the seal is made may, of course, be sufficiently pliable to enable it to be bent easily into a loop, as just explained, but in some metals of which the seal may be made it may be advantageous to have a series of holes 16 punched into the shackle portion 10 to render the latter portion more easily bendable by hand.

The locking head is transversely bent in opposite directions as at 18 and 20 which has the effect of offsetting certain functional parts of the locking head from the shackle portion 10. Such an offset is not essential to the present invention although it yields the advantage of affording more space within the shackle portion when the latter is being formed into a loop, as shown in Figs. 4 and 6. The mentioned greater space within the loop of the shackle portion enables one to more easily apply and close the seal. Also, the larger loop, in some uses, is very desirable.

The locking head 12, as illustrated, is provided with a pair of spaced parallel strengthening ribs 22 which, although not an essential feature of the invention, nevertheless, serve to prevent portions of the locking head from becoming accidentally bent out of shape. Between the strengthening ribs is a locking prong 24 pressed up out of the sheet metal of which the locking head is formed. This locking prong has a rather narrow neck 26 constituting the locking prong's integral connection to the locking head; and the outer end of the locking prong is in the form of an ear 28 which is substantially wider than the neck 26 and adjoins the latter at opposed shoulders 30. The extremity of the ear 28 is preferably rounded, as shown in the drawing, to facilitate its interconnection with the locking tongue 14 in a manner hereinafter described.

In the open or unfolded condition of the locking head 12, as manufactured and as shown in Figs. 1 and 2, a square or rectangular opening 32 is cut into the sheet metal of the locking head at an intermediate point in the latter. Intersecting said rectangular opening 32 and toward oposite sides thereof, straight, parallel, transverse scores 34 and 36 preferably extend across the entire width of the locking head. These scores serve as lines of weakness to facilitate bending of the metal thereat and additionally serve to assure breakage of the seal in the event of tampering or of efforts to open the seal without leaving evidence thereof, all in a manner explained hereinafter in detail. For reasons also explained later, it is preferred that score 34 be a relatively shallow score and that score 36 be a relatively deep score. All of the scores are shown as being cut out of the metal. They, within the invention, could be scores that are pressed into the metal or could be lines of weakness formed by the provision of series of perforations or slits. The main consideration, insofar as the scores are concerned, is that regardless of their exact nature or of the exact manner in which they are formed, they will function as hereinafter described.

It may be observed, by reference to Fig. 1, that the scores 34 and 36 have the effect of dividing the offset portion of the locking head into three parts which may sometimes hereinafter be referred to as a locking wall 38, a primary sealing flap 40, and a secondary sealing flap 42. The primary sealing flap 40 is at the extremity of the locking head 12 and its end edge preferably is bent upwardly, as best shown at 44 in Fig. 2.

The greater portion of the locking tongue 14 is offset from the shackle portion 10, as best shown in Fig. 2; the extent of such offset preferably, but not necessarily, being sufficient that, in the open or unlooped form of the device, as manufactured and as shown in Fig. 2, the general plane of the locking tongue 14 is approximately parallel to and at least slightly spaced from the general plane of the shackle portion 10. The mentioned offsetting of the locking tongue 14 provides a shoulder 46 which, however, is in two separate parts at opposite sides of the metal strip because of the provision of a locking aperture 48 having at its one end a wide transverse diameter 50 between the two parts of the shoulder 46 and at its other end a relatively narrow transverse diameter 52 at the part of the aperture 48 which is nearest to the free end of the locking tongue. The free end of the locking tongue 14 is reduced in width to form a locking lip 54 which is preferably bent up and has a rounded edge as shown. Opposed shoulders 56 are present because of the narrowing of the strip to provide the lip 54.

It should be noted that the wide diameter 50 of the aperture 48 is slightly greater than the width of ear 28 of the locking prong 24 and that the small or narrow diameter 52 of the locking aperture 48 is smaller than the width of ear 28 but slightly larger than the width of the neck 26 of the locking prong.

The seal, immediately before being put into service, is approximately as shown in Figs. 1 and 2. One wishing to apply the seal pushes it endwisely, locking tongue 14 first, through an eye of a hasp or through eyes provided on things to be sealed together. Then, with such eye or eyes at the shackle or loop portion 10 of the seal, the shackle portion 10 is bent into a loop, approximately as shown in Fig. 4, which serves to bring the locking tongue to a position overlying the locking head. Because of the fact that the shackle portion 10 is quite pliant, the user may easily bring the aperture 48 to a position above and beyond or just rightward (as viewed in Fig. 2) of the end edge of ear 28. Then, the locking tongue 14 is moved downwardly and leftwardly to cause ear 28 to enter and pass through aperture 48 at the latter's wide diameter 50. As such downward and leftward movement of the locking tongue 14 is continued, the angularity of the ear 28 and of the neck 26 of the locking prong (best shown in Figs. 2 and 4) brings the locking tongue 14 into more intimate face-to-face association with the locking head 12.

When the just-described leftward movement of the locking tongue 14 has continued to the point at which the neck 26 is within aperture 48 at the latter's narrow diameter 52, the bent end of locking lip 54 drops or lowers into the rectangular opening 32, as may best be understood from Fig. 4. Then, the one applying the seal manually pivots the sealing flap 40, in the direction shown by the dotted-line arrow 58 in Fig. 4. This causes bending of the strip at both of scores 34 and 36 and causes the sealing flap 40 to press down the ear 28 and intimately overlie the greater portion of the remainder of the locking head and of the locking tongue, as shown in Fig. 6, in which condition the bent marginal portion 44, of the primary sealing flap, nests into one side of the offset between the locking tongue 14 and the shackle portion 10. Because of the end of margin 44 of the primary sealing flap being bent and nested into the offset, as just explained, the possibility that said sealing flap might accidentally or unintentionally be reversely bent and broken away from the rest of the seal is substantially obviated.

The described seal when thus closed is practically tamper-proof. The only way that the seal could conceivably be opened would be by pushing the locking tongue 14 rightwardly, as viewed in Fig. 6, to enable the ear 28 to pass back into and through the aperture 48. Such rightward movement, however, is impossible because of the fact that, as the lip 54, when the device is closed, extends through the rectangular opening 32, any attempted rightward movement of the locking tongue would bring the sohulders 56 up against the metal defining opopsite sides of the opening 32 or, i.e., up against the secondary sealing flap 42, and such inter-engagement of said shoulders with the secondary sealing flap would positively prevent such rightward movement of the locking tongue.

In view of the impossibility of withdrawing ear 28 through aperture 48 by such rightward movement of the locking tongue, it follows that the locking tongue cannot be moved leftwardly to disassociate it from the locking head because the neck 26 of the locking prong positively prevents such leftward movement. If an interloper sought to open the seal in the hope that he could reuse it without leaving evidence of the fact that it had been opened and possibly reclosed, he would attempt to pivot the primary sealing flap 40 in the direction opposite to the arrow 58 of Fig. 4 in the hope of so flattening the strip of metal that he could lift the locking lip 54 out of the opening 32 and thus free the locking tongue for disassociation from the locking prong 24. But any such attempt to thus reversely pivot the sealing flap 40 would result in breakage of the seal at one or the other of the scores 34, 36, probably at score 36 because of the fact that the latter is the deeper score of the two.

If, as would probably be the case in every such attempt, the breakage occurred at score 36, then the secondary sealing flap 42, or rather the two parts constituting such a flap, would still serve as an abutment preventing the rightward movement of the locking tongue which would be necessary in order to completely open the device. Hence, even though the sealing flap 40 breaks away, thus leaving clear evidence of tampering, the seal would still remain locked as a fastening device. Of course, once the sealing flap 40 breaks away, the seal cannot be restored to its original closed condition.

It should be understood that the disclosed inventive concept may be utilized in various other structures without departing from the invention as set forth in the following claims.

We claim:

1. A seal comprising a strip of sheet material having a first locking portion adjacent its one end, a second locking portion adjacent its other end, and an intermediate shackle portion bendable into a loop; said locking portions having interlocking parts which, when said locking portions are in intimate face-to-face locking association, are separable only as a result of material relative shifting of said locking portions in opposite directions and in planes parallel to their associated faces, said interlocking parts being in abutting relationship in the presence of relative shifting in one of said directions, and one of said locking portions having a sealing flap and an area of weakness between the latter and said one locking portion, said sealing flap being manually bendable about said area of weakness to a sealing position overlying the other of said locking portions and, when thus bent, constituting an abutment coacting with said other locking portion to prevent such relative shifting in the other of said directions; said sealing flap being manually bendable about said area of weakness from said sealing position to a position clear of abutment with said other locking portion to permit manual opening of the seal, and said area of weakness facilitating bending thereat and causing breakage thereat upon repeated bending.

2. A seal comprising a strip of sheet material having an elongate shackle portion, a locking head at one end of the shackle portion and a locking tongue at the latter's other end; the locking head comprising a relatively flat locking wall which at one of its ends adjoins said shackle portion, and a sealing flap adjoining the other end of said locking wall, the locking head having a narrow, transverse area of weakness at the juncture of said locking wall and said sealing flap, enabling the latter to be bent readily to a substantial extent about said area of weakness and inducing breakage thereat upon repeated bending, the locking wall having a locking prong extending therefrom at an acute angle toward said area of weakness; the locking tongue having therein an aperture adapted to receive said prong therewithin when the shackle portion is bent into a loop and the locking tongue moved longitudinally of the prong in one direction into face-to-face association with said locking wall, said sealing flap being subsequently bendable about said area of weakness into close, sealing, overlying relationship to said locking tongue and adapted, when thus bent, to oppose opposite movement of the locking tongue longitudinally of the prong and thereby hold the locking tongue and the locking head against separation, the locking tongue having a transverse edge, adjacent its end remote from the shackle position, which edge is spaced from the aperture in the locking tongue, the juncture of the locking prong with said locking wall being spaced from said area of weakness approximately to the same extent as the mentioned spacing of said transverse edge from the locking tongue's said aperture, and said area of weakness being adapted to abut said transverse edge when the sealing flap is in its said sealing relationship to the locking tongue to prevent disassociation of the latter from said prong.

3. A seal comprising a strip of sheet material having a shackle portion, a locking head at one end of the shackle portion and a locking tongue at the other end of the shackle portion adapted, by bending of the latter, to be juxtaposed and locked to the locking head; the locking head having a substantially flat locking wall, and a locking prong integral with said wall and having a neck and an enlarged ear extending from the plane of said wall; the locking tongue having a substantially flat portion with an aperture therein adapted to receive said locking prong and to retain the latter's ear against withdrawal from said aperture when said prong is at one end of said aperture; and said locking head having a sealing flap at one end of said wall and a narrow, transverse area of weakness between said wall and said sealing flap enabling the latter to be bent readily thereat to a sealing position substantially overlying said prong but inducing breakage at said area of weakness upon rebending thereat; the sealing flap, in said sealing position, coacting with said prong and with said locking tongue to prevent the latter from shifting longitudinally and thereby prevent the locking prong from withdrawing from said aperture in the locking tongue, said prong extending toward said sealing flap at an acute angle relatively to said locking wall, the aperture in the sealing tongue having a wide transverse diameter, toward its end nearest to said shackle portion, of such width as to permit said ear to pass therethrough and a narrow transverse diameter, toward the opposite end of said aperture, of a width greater than said neck and lesser than said ear; the sealing flap, in its said sealing position, being adapted to hold the sealing tongue in position with said neck within said narrow diameter of said aperture, said sealing tongue having a protruding, bent, integral locking lip at its free end and a shoulder at one side of said lip, and the locking head having an aperture at said area of weakness; said lip being adapted to enter said locking head's aperture and said shoulder being adapted to abut a marginal portion defining one side of the latter aperture, when the sealing flap is in its said sealing position, to hold the sealing tongue in position with said neck within said narrow dameter of the locking tongue's mentioned aperture.

4. A seal comprising a strip of sheet material having an elongate shackle portion, a locking head having a first substantially flat wall adjoining one end of the shackle portion, a locking tongue at the shackle portion's other end, having a second substantially flat wall, and a sealing flap adjoining said first wall oppositely from said shackle portion; the locking head having a narrow, transverse area of weakness at the juncture of said first wall and said sealing flap, enabling the latter to be manually bent readily to a substantial extent about said area of weakness and inducing breakage thereat upon repeated bending; said seal including a locking prong extending angularly from one of said walls, the other of said walls having therein an aperture adapted to receive said locking prong therewithin when the shackle portion is bent into a loop and the two said walls are moved relatively to each other into intimate face-to-face, locking association, said prong, when in said aperture, coacting with said other of said walls to limit relative longitudinal movement of said two flat walls in one direction and to prevent separation of said two flat walls when said two flat walls are in relative positions resulting from said movement in said one direction, said sealing flap being manually bendable about said area of weakness into close, sealing, overlying relationship to said locking tongue and providing, when thus bent, an abutment opposing relative longitudinal movement of said two flat walls in an opposite direction, whereby to hold the locking tongue and the locking head against separation; and said sealing flap being manually bendable about said area of weakness substantially away from said sealing, overlying relationship to a position clear of abutment with any part of the seal to permit manual opening of the seal.

5. A seal comprising a strip of sheet material having an elongate shackle portion, a locking head at one end of the shackle portion, and a locking tongue at the shackle portion's other end; said locking head comprising a substantially flat locking wall which, at one of its ends, adjoins said shackle portion, and a sealing flap adjoining the other end of said locking wall; the seal having a narrow transverse area of weakness at the juncture of said locking wall and said sealing flap, enabling the latter to be manually bent readily to a substantial extent about said area of weakness and inducing breakage thereat upon repeated bending; the locking wall having a locking prong extending therefrom at an acute angle toward said area of weakness, the locking tongue having therein an aperture adapted to receive said prong therewithin when the shackle portion is bent into a loop and the locking tongue moved longitudinally of the prong in one direction into intimate face-to-face association with said locking wall, said prong, when in said aperture, coacting with said locking tongue to limit said longitudinal movement in said one direction and being locked within said aperture when said locking tongue is at said limit of movement, said sealing flap being manually bendable about said area of weakness into close, sealing, overlying relationship to said locking tongue and adapted, when thus bent, to oppose longitudinal movement of the locking tongue in an opposite direction, whereby to hold the locking tongue and the locking head against separation, and said sealing flap being manually bendable about said area of weakness substantially away from said locking tongue to permit said longitudinal movement of the locking tongue in said opposite direction whereby to enable the seal to be opened.

6. A seal according to claim 5, said locking prong having an enlarged head and a neck, narrower than said head, where the prong adjoins said locking wall, the said locking tongue's aperture having a wide area, at its end nearest to the shackle portion, capable of admitting the locking prong's head therethrough, and a narrow area at its opposite end capable of admitting said prong's neck but not the prong's head therewithin; the stated relative sizes of parts of the prong and of the tongue's aperture rendering said tongue and said locking wall inseparable when said locking tongue is at its limit of longitudinal movement in said one direction.

7. A seal comprising a strip of sheet material having an elongate shackle portion, a locking head at one end of the shackle portion and a locking tongue at the latter's other end; the locking head comprising a relatively flat locking wall which at one of its ends adjoins said shackle portion, and a sealing flap adjoining the other end of said locking wall, the locking head having a narrow, transverse area of weakness at the juncture of said locking wall and said sealing flap, enabling the latter to be bent readily to a substantial extent about said area of weakness and inducing breakage thereat upon repeated bending, the locking wall having a locking prong extending therefrom at an acute angle toward said area of weakness; the locking tongue having therein an aperture adapted to receive said prong therewithin when the shackle portion is bent into a loop and the locking tongue moved longitudinally of the prong in one direction into face-to-face association with said locking wall, said sealing flap being subsequently bendable about said area of weakness into close, sealing, overlying relationship to said locking tongue and adapted, when thus bent, to oppose opposite movement of the locking tongue longitudinally of the prong and thereby hold the locking tongue and the locking head against separation, said locking prong having an enlarged head and a neck narrower than said head, where the prong adjoins said locking wall, the said locking tongue's aperture having a wide area, at its end nearest to the shackle portion, capable of admitting the locking prong's head therethrough, and a narrow area at its opposite end capable of admitting said prong's neck but not the prong's head therewithin; the stated relative sizes of parts of the prong and of the locking tongue's aperture rendering said locking tongue and said locking wall inseparable except by shifting of said locking tongue toward said area of weakness, and said sealing flap being adapted to prevent such last-mentioned shifting of the locking tongue when the flap is in said sealing relationship, said locking tongue having a bent locking lip at its free edge and said locking head having an aperture to receive said locking tongue therewithin, the locking tongue having shoulders, at opposite sides of said lip, adapted to abut side marginal portions defining the locking head's said aperture when the sealing flap is in its sealing relationship, to oppose such shifting of the locking tongue toward said area of weakness.

References Cited in the file of this patent

UNITED STATES PATENTS

| | | |
|---|---|---|
| 1,615,057 | Tyden | Jan. 18, 1927 |
| 1,847,552 | Brooks | Mar. 1, 1932 |
| 2,761,720 | Brooks | Sept. 4, 1956 |
| 2,778,666 | Moberg | Jan. 22, 1957 |

Dedication 2,913,274.—*Winfred M. Brooks*, West Orange, and *Sigurd M. Moberg*, Pompton Plains, N.J. LOOP SEAL. Patent dated Nov. 17, 1959. Dedication filed Feb. 9, 1972, by the assignee, *E. J. Brooks Company*.

Hereby dedicates to the Public the term thereof remaining after Oct. 1, 1970.

[*Official Gazette July 25, 1972.*]